US009435632B2

(12) United States Patent
Ozaki

(10) Patent No.: US 9,435,632 B2
(45) Date of Patent: Sep. 6, 2016

(54) STATOR OF RESOLVER AND METHOD FOR ASSEMBLING STATOR ASSEMBLY

(71) Applicant: Japan Aviation Electronics Industry, Ltd., Tokyo (JP)

(72) Inventor: Yoshiaki Ozaki, Tokyo (JP)

(73) Assignee: JAPAN AVIATION ELECTRONICS INDUSTRY, LTD., Tokyo (JP)

( * ) Notice: Subject to any disclaimer, the term of this patent is extended or adjusted under 35 U.S.C. 154(b) by 148 days.

(21) Appl. No.: 14/387,398

(22) PCT Filed: Mar. 25, 2013

(86) PCT No.: PCT/JP2013/002019
§ 371 (c)(1),
(2) Date: Sep. 23, 2014

(87) PCT Pub. No.: WO2013/145698
PCT Pub. Date: Oct. 3, 2013

(65) Prior Publication Data
US 2015/0061651 A1  Mar. 5, 2015

(30) Foreign Application Priority Data
Mar. 30, 2012 (JP) .................. 2012-080440

(51) Int. Cl.
*G01B 7/30* (2006.01)
*H02K 24/00* (2006.01)
(Continued)

(52) U.S. Cl.
CPC ............... *G01B 7/30* (2013.01); *H02K 3/522* (2013.01); *H02K 24/00* (2013.01); *H01R 39/32* (2013.01); *H02K 5/225* (2013.01); *Y10T 29/4902* (2015.01)

(58) Field of Classification Search
CPC ........ G01B 7/30; H02K 24/00; H02K 3/522; H02K 5/225; H01R 39/32; Y10T 29/4902
USPC ............... 324/207.15–207.25; 310/68 B, 71; 318/661
See application file for complete search history.

(56) References Cited

U.S. PATENT DOCUMENTS 3,420,087 A  1/1969 Hatfield et al.
5,920,135 A  7/1999 Ohshita
(Continued)

FOREIGN PATENT DOCUMENTS

EP  0 875 980 A2  11/1998
JP  11-98747 A  4/1999
(Continued)

OTHER PUBLICATIONS

International Search Report dated May 14, 2013 from corresponding International Patent No. PCT/JP2013/002019; 1 pg.
(Continued)

Primary Examiner — Jay Patidar
(74) Attorney, Agent, or Firm — Maier & Maier, PLLC

(57) ABSTRACT

A stator of a resolver includes a stator body including multiple magnetic pole portions; multiple stator windings respectively wound around the magnetic pole portions; multiple terminal pins each including a stator winding connecting portion around which the corresponding stator winding is wound; and an external cable connecting portion to be connected with an external cable; and a terminal pin holding portion that holds the terminal pins. The stator winding connecting portion of each terminal pin is formed in a double layer by folding a metal piece and has a fold formed when the metal piece is folded. The fold of the stator winding connecting portion of each terminal pin is formed along a longitudinal direction of the stator winding connecting portion.

7 Claims, 18 Drawing Sheets

(51) Int. Cl.
*H02K 3/52* (2006.01)
*H02K 5/22* (2006.01)
*H01R 39/32* (2006.01)

(56) References Cited

U.S. PATENT DOCUMENTS

| | | | |
|---|---|---|---|
| 6,030,260 A * | 2/2000 | Kikuchi | H01R 39/32 310/71 |
| 6,077,131 A | 6/2000 | Fukuda et al. | |
| 7,726,006 B2 * | 6/2010 | Teshima | H02K 15/0056 29/596 |
| 2007/0262664 A1 * | 11/2007 | Niehaus | H02K 3/522 310/71 |
| 2011/0279112 A1 * | 11/2011 | Aihara | H02K 24/00 324/207.25 |

FOREIGN PATENT DOCUMENTS

| | | |
|---|---|---|
| JP | 2000340272 A | 12/2000 |
| JP | 2006-109568 A | 4/2006 |
| JP | 2011-200007 A | 10/2011 |

OTHER PUBLICATIONS

Partial Supplementary European Search Report issued in corresponding European Patent Application No. 13 76 7867 on May 31, 2016 (7 pgs.).

* cited by examiner

STATOR OF RESOLVER AND METHOD FOR ASSEMBLING STATOR ASSEMBLY

TECHNICAL FIELD

The present invention relates to a stator of a resolver and a method for manufacturing a stator assembly.

BACKGROUND ART

As a technique of this type, Patent Literature 1 discloses a terminal pin 100 which is connected with an end of a coil of a resolver as shown in FIG. 18 of the present application. This terminal pin 100 has a projection 100a. The end of the coil is electromechanically connected to the projection 100a by winding or the like. The projection 100a is folded to be formed in a double layer.

CITATION LIST

Patent Literature

[Patent Literature 1] Japanese Unexamined Patent Application Publication No. H11-98747

SUMMARY OF INVENTION

Technical Problem

However, in the structure disclosed in Patent Literature 1 described above, there is some room for improvement in the strength of the projection 100a.

It is an object of the present invention to provide a technique for improving the strength of the terminal pin.

Solution to Problem

According to an aspect of the present invention, a stator of a resolver is provided, including: a stator body including a plurality of magnetic pole portions; a plurality of stator windings respectively wound around the magnetic pole portions; a plurality of terminal pins each including: a stator winding connecting portion around which the corresponding stator winding is wound; and an external cable connecting portion to be connected with an external cable; and a terminal pin holding portion that holds the plurality of terminal pins. The stator winding connecting portion of each of the terminal pins is formed in a double layer by folding a metal piece, and has a fold formed when the metal piece is folded. The fold of the stator winding connecting portion of each of the terminal pins is formed along a longitudinal direction of the stator winding connecting portion.

Preferably, the stator winding connecting portion of each of the terminal pins has a single fold and the stator winding connecting portion of each of the terminal pins has a U-shaped cross-section.

Preferably, a distal end of the stator winding connecting portion of each of the terminal pins has a tapered shape.

Preferably, the distal end of the stator winding connecting portion of each of the terminal pins is tapered in a V-shape.

Preferably, the plurality of external cable connecting portions are arranged in a staggered manner.

Preferably, each of the external cable connecting portions is an open barrel type.

According to a second aspect of the present invention, a method for manufacturing a stator assembly is provided, the stator assembly including: a plurality of external cables; and a stator of a resolver, the stator including: a stator body including a plurality of magnetic pole portions; a plurality of stator windings respectively wound around the magnetic pole portions; a plurality of terminal pins each including a stator winding connecting portion around which the corresponding stator winding is wound and an external cable connecting portion to be connected with the corresponding external cable; and a terminal pin holding portion that holds the plurality of terminal pins, the plurality of external cable connecting portions being arranged in a staggered manner, the method including the steps of: connecting the external cables to front-side external cable connecting portions, respectively, the front-side external cable connecting portions serving as external cable connecting portions disposed on a front side among the plurality of external cable connecting portions arranged in the staggered manner; bending the terminal pins respectively including the front-side external cable connecting portions to cause the front-side external cable connecting portions to be displaced; and connecting the external cables to back-side external cable connecting portions, respectively, the back-side external cable connecting portions serving as external cable connecting portions disposed on a back side among the plurality of external cable connecting portions arranged in the staggered manner.

According to a third aspect of the present invention, a stator assembly is provided, including: a plurality of external cables; and a stator of a resolver, the stator including: a stator body including a plurality of magnetic pole portions; a plurality of stator windings respectively wound around the magnetic pole portions; a plurality of terminal pins each including a stator winding connecting portion around which the corresponding stator winding is wound and an external cable connecting portion to be connected with the corresponding external cable; and a terminal pin holding portion that holds the plurality of terminal pins, the plurality of external cable connecting portions being arranged in a staggered manner. The external cables are connected to front-side external cable connecting portions, respectively, the front-side external cable connecting portions serving as external cable connecting portions disposed on a front side among the plurality of external cable connecting portions arranged in the staggered manner. The terminal pins respectively including the front-side external cable connecting portions are bent to cause the front-side external cable connecting portions to be displaced. The external cables are connected to back-side external cable connecting portions, respectively, the back-side external cable connecting portions serving as external cable connecting portions disposed on a back side among the plurality of external cable connecting portions arranged in the staggered manner.

Advantageous Effects of Invention

According to the present invention, an improvement in the strength of the stator winding connecting portion can be achieved.

DESCRIPTION OF EMBODIMENTS

First Embodiment

A first embodiment of the present invention will be described below with reference to FIGS. 1 to 16.

Figure 1:
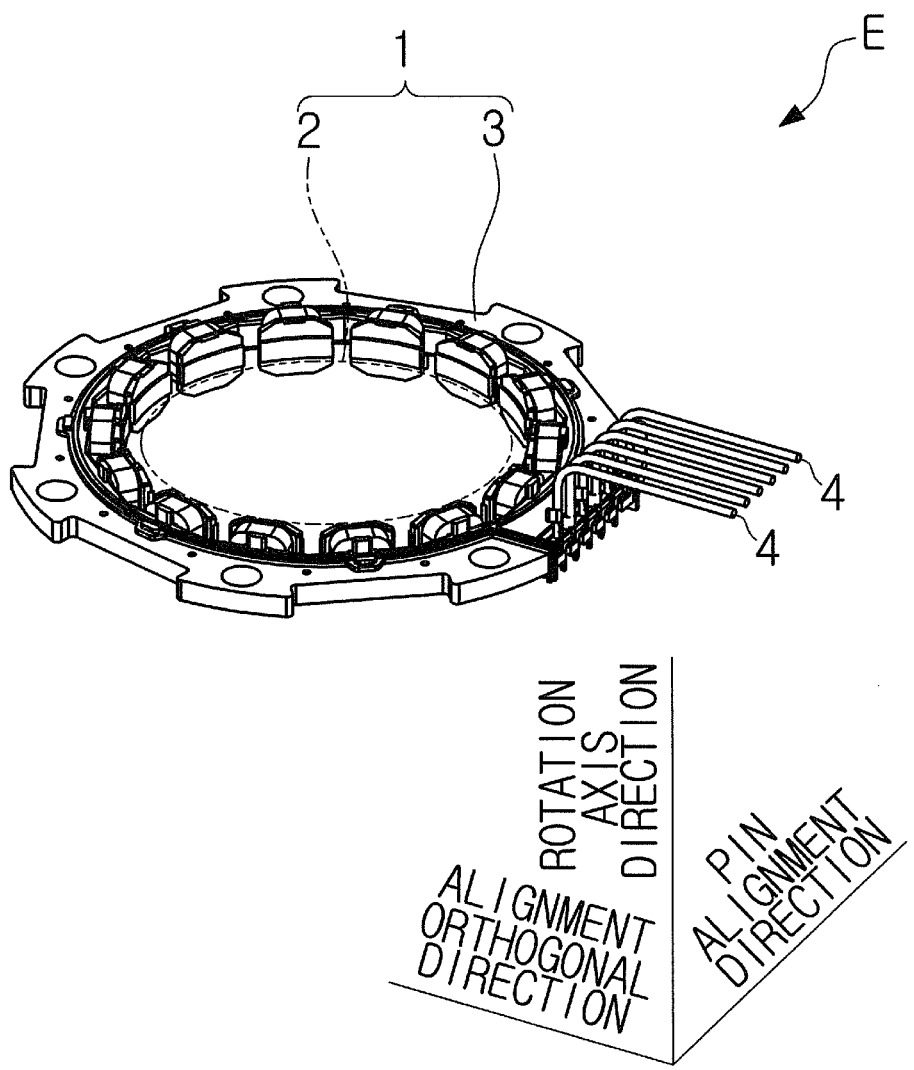
FIG. 1 is a perspective view of a resolver having a plurality of external cables attached thereto (first embodiment)
Figure 2:
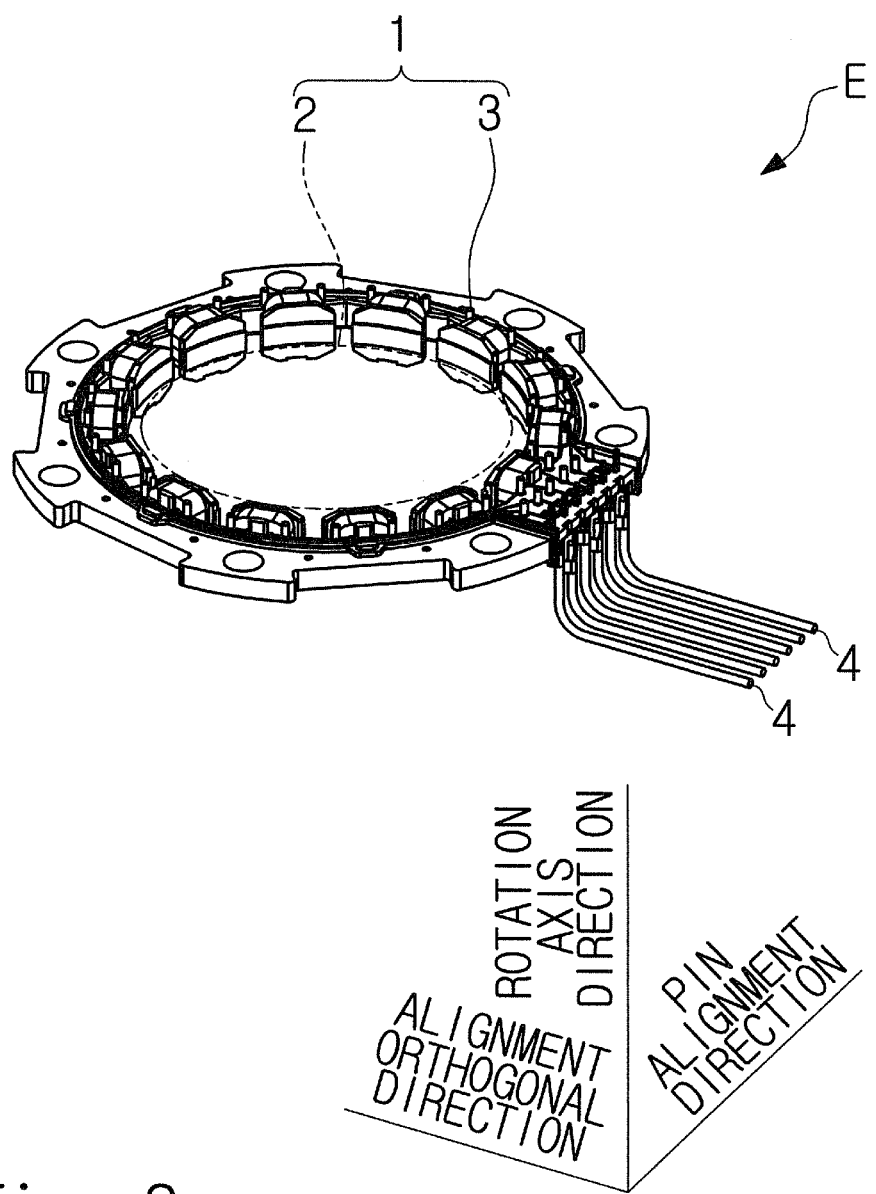
FIG. 2 is a perspective view of the resolver having the plurality of external cables attached thereto, when viewed from another angle (first embodiment)
Figure 3:
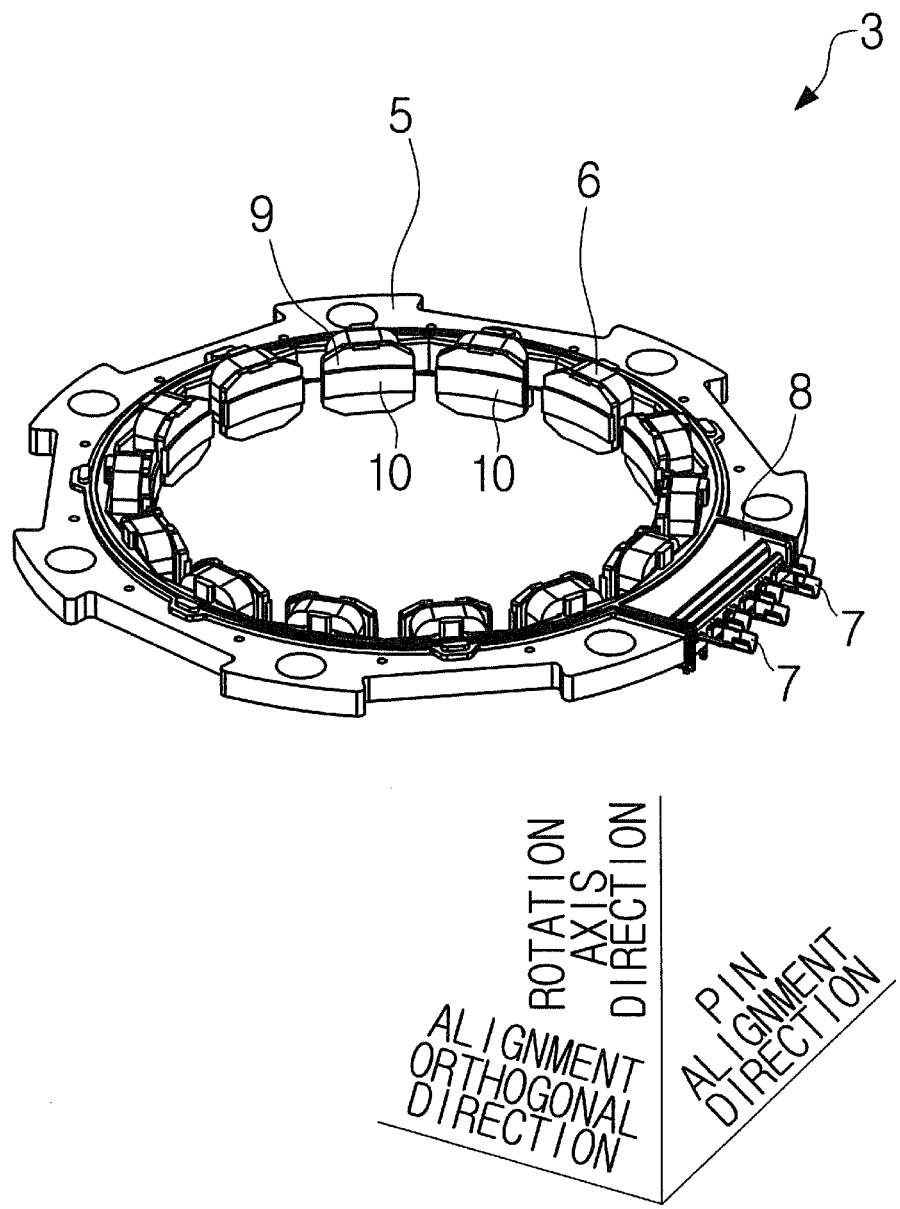
FIG. 3 is a perspective view of a stator of the resolver (first embodiment)

As shown in FIGS. 1 and 2, a resolver 1 serving as an angle detector includes a rotor 2 which is indicated by an alternate long and two short dashes line, and a stator 3 which is formed in a ring shape. The rotor 2 is fixed to an output shaft of an electric motor, which is not shown, and thereby rotates with the output shaft. The stator 3 is fixed to, for example, a body of the electric motor. A plurality of external cables 4 are connected to the stator 3. In this structure, when the rotor 2 rotates relatively to the stator 3, a rotation signal corresponding to the rotation is generated in the stator 3 and is output to the outside through the external cables 4.

In this embodiment, a stator assembly E is composed of the plurality of external cables 4 and the stator 3.

As shown in FIGS. 3 to 6, the stator 3 includes a stator body 5, a plurality of stator windings 6, a plurality of terminal pins 7, a terminal pin holding portion 8, and an insulation cover 9.

The stator body 5 is a stacked structure which is made of a magnetic material and is formed in a ring shape. The stator body 5 includes a plurality of magnetic pole portions 10 which project toward the inner peripheral side.

The plurality of stator windings 6 are respectively wound around the plurality of magnetic pole portions 10 of the stator body 5.

The plurality of terminal pins 7 are metallic members that connect the plurality of stator windings 6 to the plurality of external cables 4, respectively.

The terminal pin holding portion 8 is a portion that supports the plurality of terminal pins 7. The terminal pin holding portion 8 is formed on the stator body 5.

The insulation cover 9 is a cover that electrically isolates the stator body 5 from the plurality of stator windings 6. In this embodiment, the terminal pin holding portion 8 and the insulation cover 9 are integrally formed.

The terms "rotation axis direction", "pin alignment direction", and "alignment orthogonal direction" are now defined. The rotation axis direction is a direction parallel to the axis of the rotation of the rotor 2 as shown in FIGS. 1 and 2. The pin alignment direction is a direction in which the plurality of terminal pins 7 are aligned as shown in FIGS. 3 to 6. The pin alignment direction is orthogonal to the rotation axis direction. The alignment orthogonal direction is orthogonal to each of the rotation axis direction and the pin alignment direction.

(Terminal Pins 7)

Figure 4:
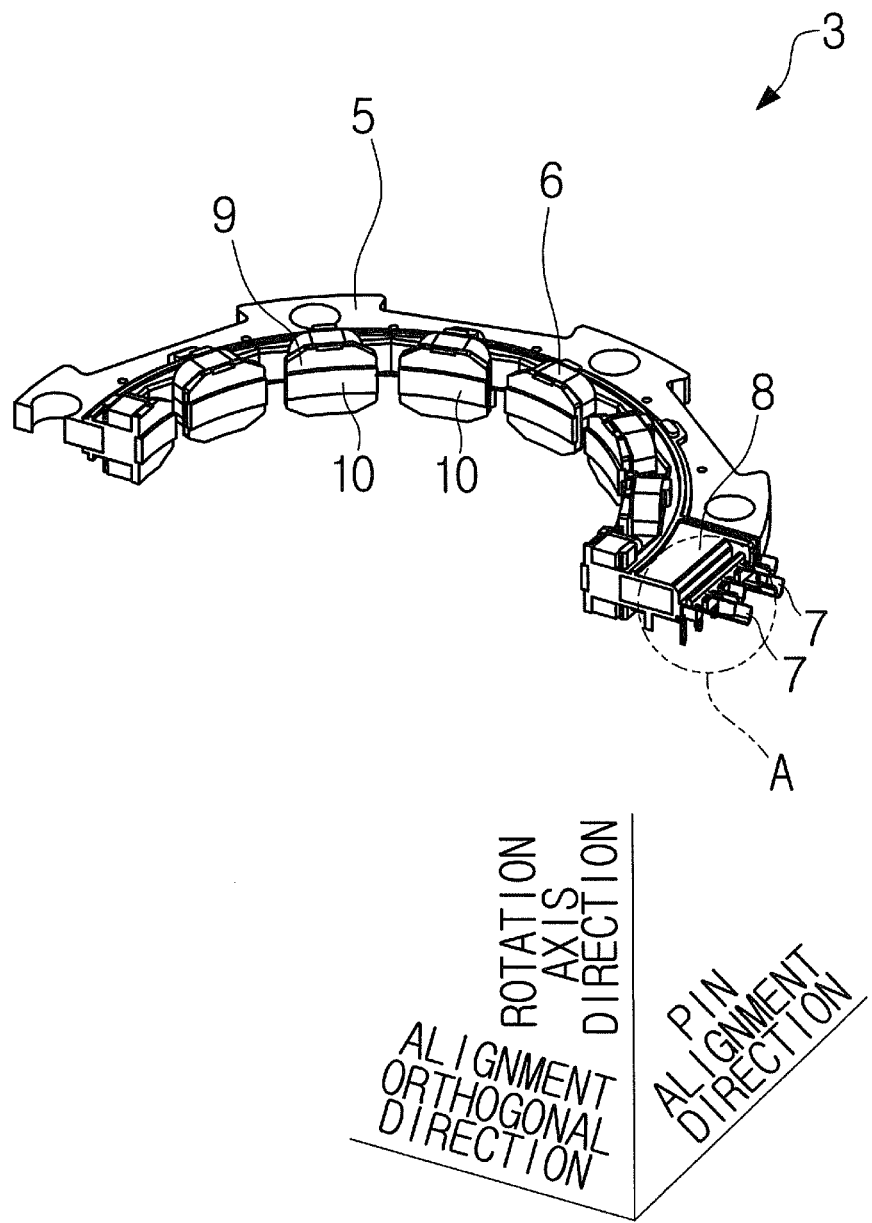
FIG. 4 is a partially cutaway perspective view of FIG. 3 (first embodiment)
Figure 5:
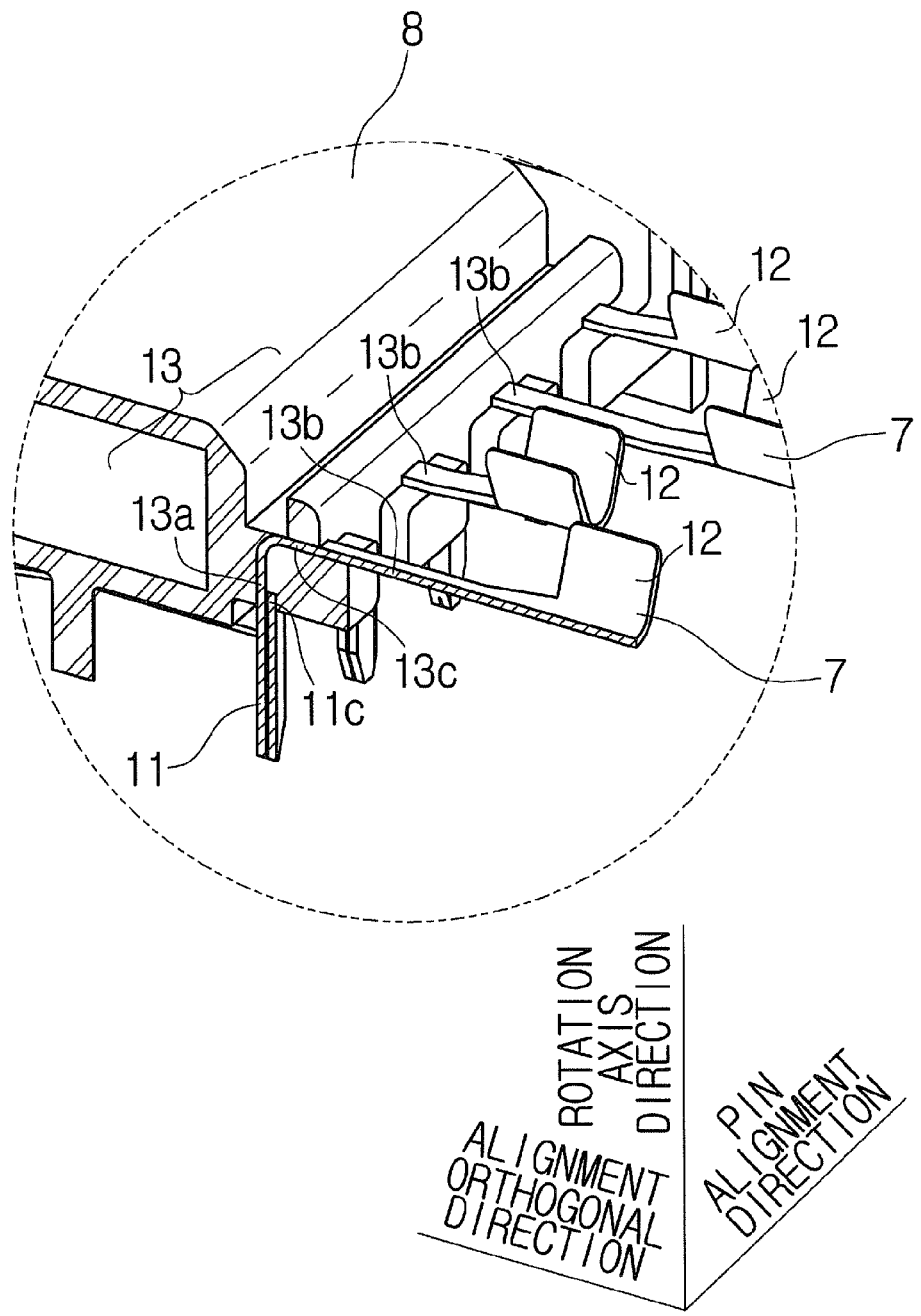
FIG. 5 is an enlarged view of a portion "A" shown in FIG. 4 (first embodiment)
Figure 6:
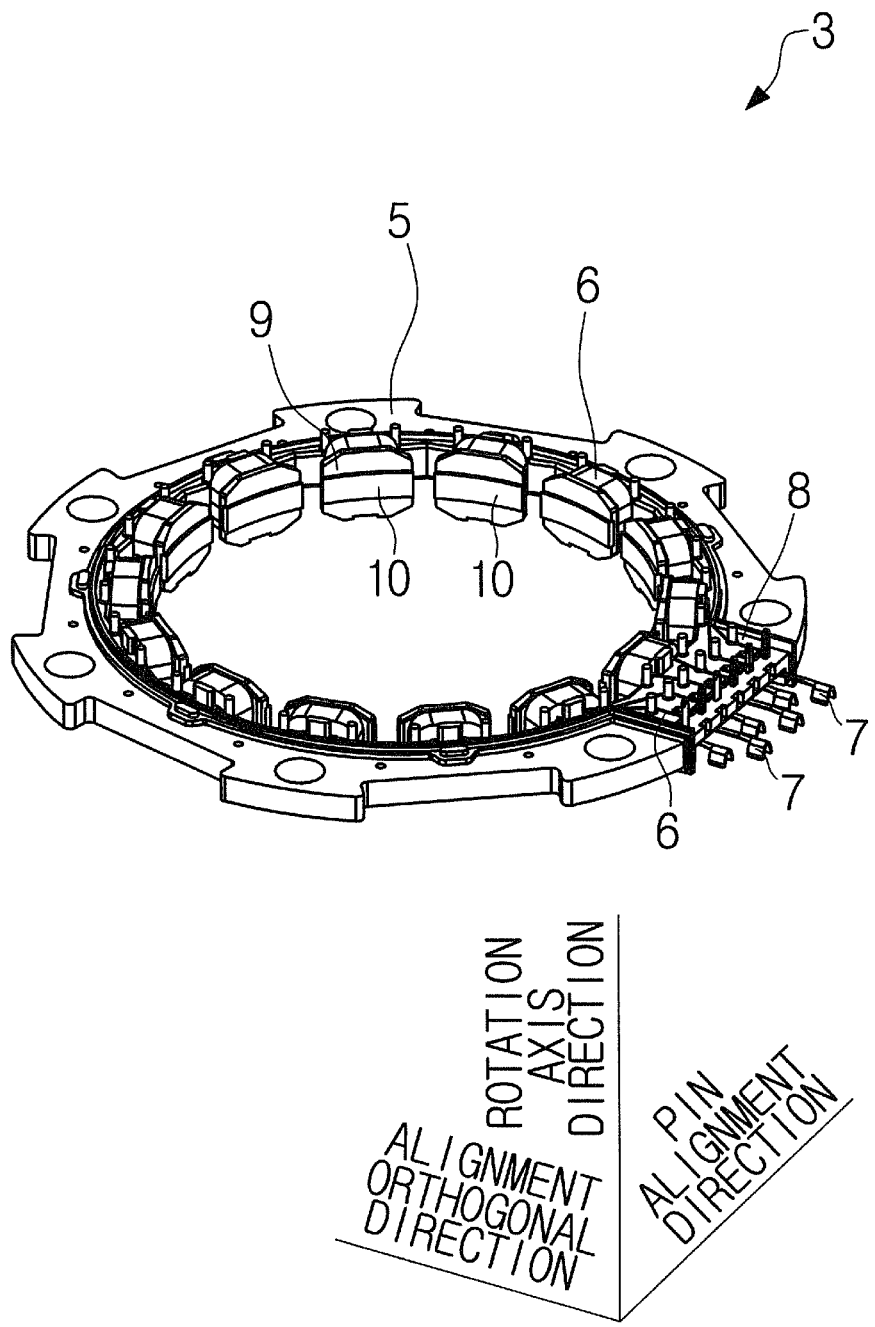
FIG. 6 is a perspective view of the stator of the resolver when viewed from another angle (first embodiment)
Figure 7:
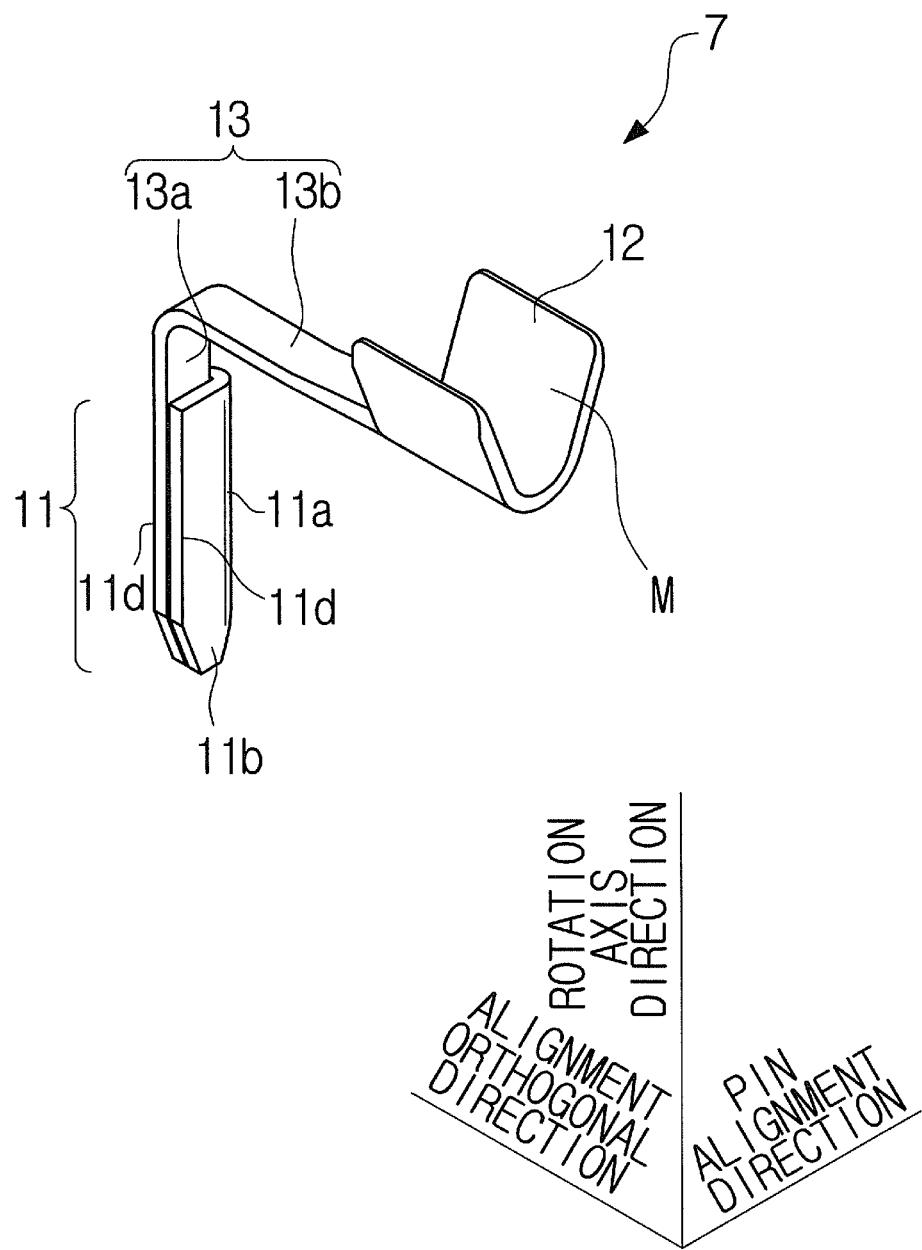
FIG. 7 is a perspective view of a terminal pin (first embodiment)
Figure 8:
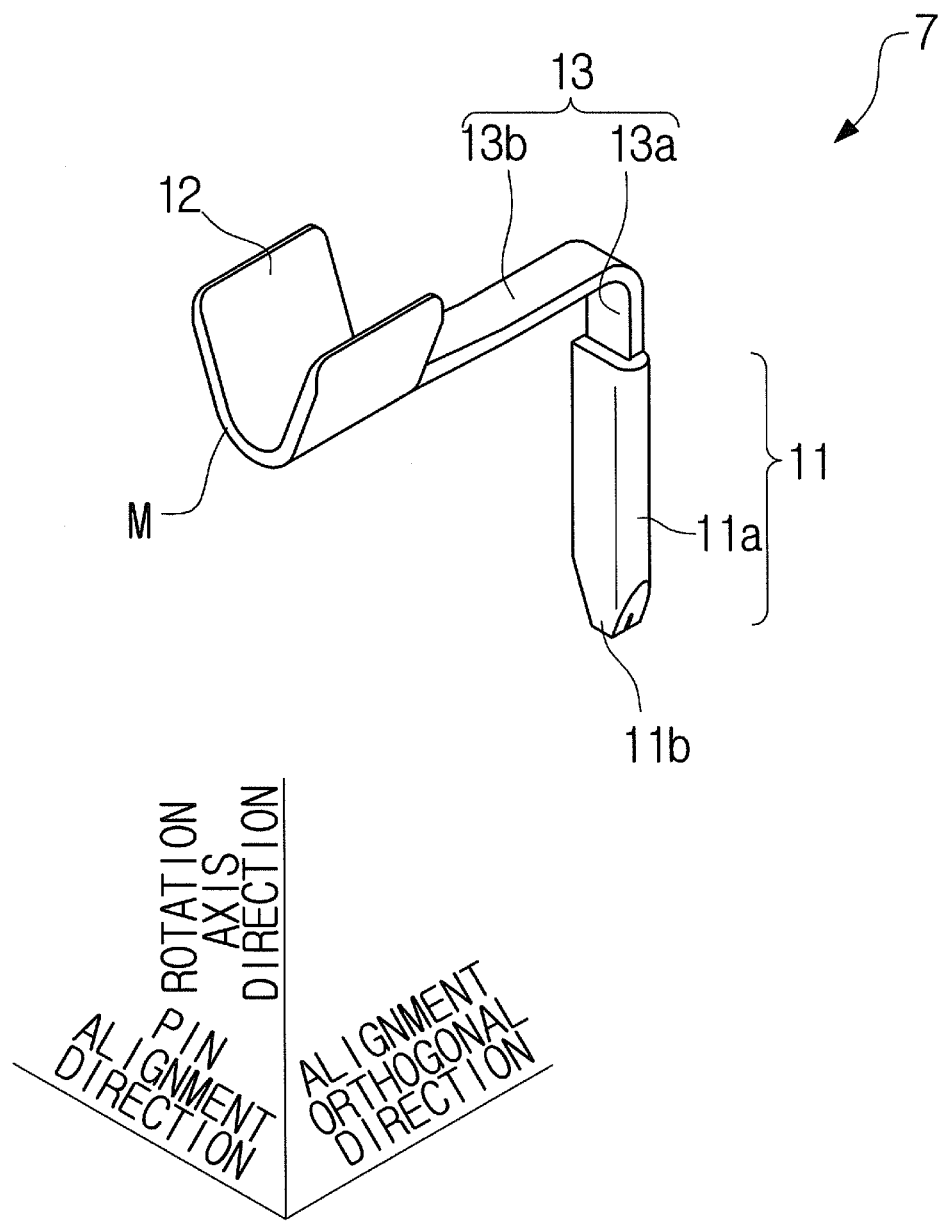
FIG. 8 is a perspective view of the terminal pin when viewed from another angle (first embodiment)
Figure 9:
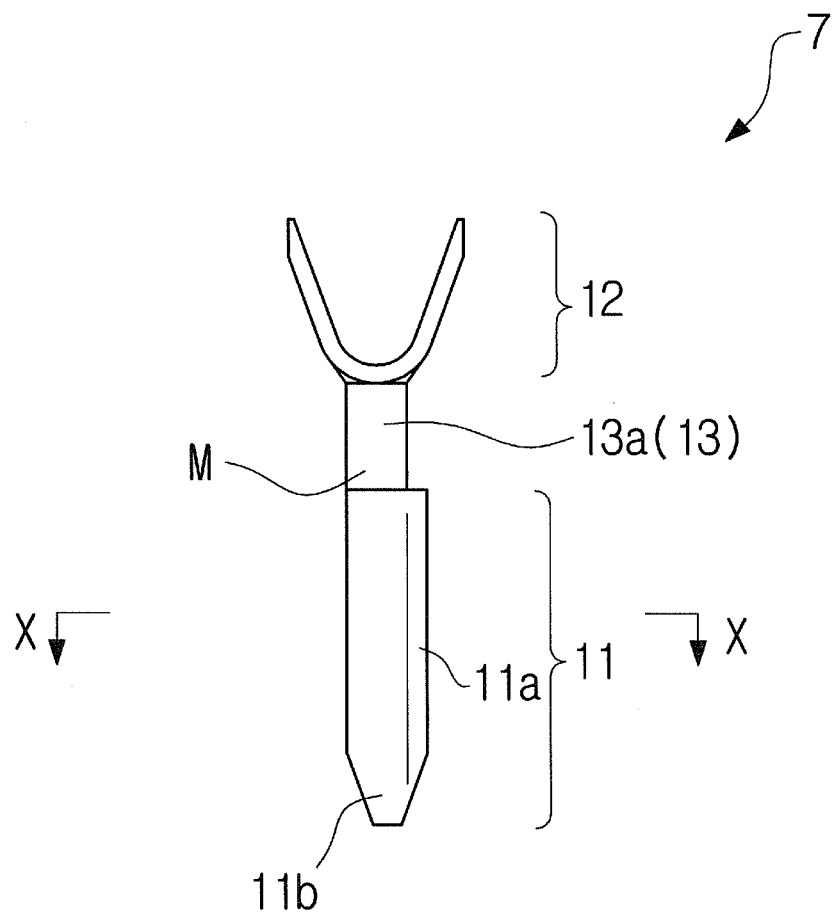
FIG. 9 is a front view of the terminal pin (first embodiment)

As shown in FIGS. 4 and 5, the plurality of terminal pins 7 are held in the terminal pin holding portion 8 by insert molding. As shown in FIGS. 7 to 9, each terminal pin 7 includes a stator winding connecting portion 11, an external cable connecting portion 12, and an L-shaped portion 13. Each terminal pin 7 is formed by bending a metal piece M. The stator winding connecting portion 11, the external cable connecting portion 12, and the L-shaped portion 13 are integrally formed.

Figure 10:
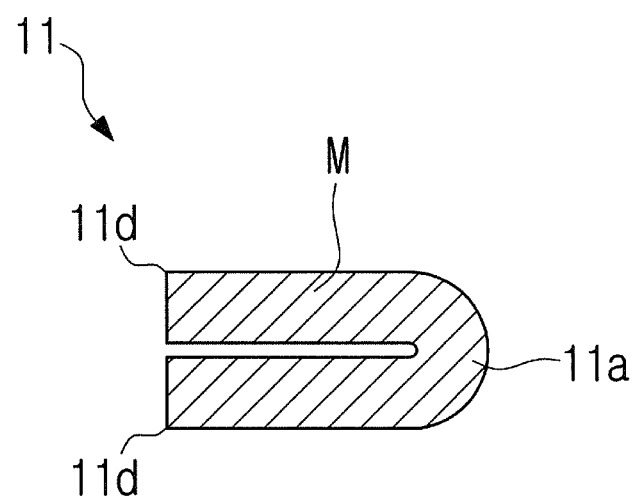
FIG. 10 is a sectional view taken along the line X-X of FIG. 9 (first embodiment)

The stator winding connecting portion 11 is a portion around which the corresponding stator winding 6 is wound. The stator winding connecting portion 11 is a portion to be connected with the corresponding stator winding 6. The stator winding connecting portion 11 is elongated along the rotation axis direction. The stator winding connecting portion 11 is formed in a double layer by folding the metal piece M. The stator winding connecting portion 11 has a fold 11a which is formed when the metal piece M is folded. The fold 11a is formed along the longitudinal direction of the stator winding connecting portion 11. The fold 11a is formed along the rotation axis direction. The stator winding connecting portion 11 has a single fold 11a. In other words, the stator winding connecting portion 11 is formed by folding the metal piece M only once. As a result, as shown in FIG. 10, the stator winding connecting portion 11 has a U-shaped cross-section. The stator winding connecting portion 11 has two cutting edges 11d capable of cutting the stator winding 6. Each cutting edge 11d is formed along the rotation axis direction as shown in FIG. 7.

As shown in FIG. 9, a distal end 11b of the stator winding connecting portion 11 has a tapered shape when viewed along the thickness direction of the distal end 11b of the stator winding connecting portion 11. Specifically, the distal end 11b of the stator winding connecting portion 11 is tapered in a V-shape. The "V-shape" described herein includes not only a perfect V-shape, but also a substantial V-shape, such as an isosceles trapezoidal shape. In this embodiment, the distal end 11b of the stator winding connecting portion 11 is tapered in an isosceles trapezoidal shape.

To connect the stator winding 6 to the stator winding connecting portion 11 in the structure described above, an end of the stator winding 6 is wound around the stator winding connecting portion 11, and an unnecessary portion of the stator winding 6 is cut by the cutting edges 11d shown in FIG. 7. After that, electricity is discharged to the distal end 11b of the stator winding connecting portion 11, thereby causing the stator winding connecting portion 11 to partially melt. This allows the stator winding connecting portion 11 and the stator winding 6 to be alloyed and combined at the distal end 11b of the stator winding connecting portion 11.

The external cable connecting portion 12 is a portion to be connected with the corresponding external cable 4. In this embodiment, the external cable connecting portion 12 is a so-called open barrel type. Instead of using the open barrel type, a closed barrel type may be used as the external cable connecting portion 12.

The L-shaped portion 13 is a portion that joins the stator winding connecting portion 11 and the external cable connecting portion 12 together. As shown in FIGS. 7 and 8, the L-shaped portion 13 is a portion that is bent in an L-shape. The L-shaped portion 13 is composed of a winding-side L-shaped portion 13a which is disposed on the side of the stator winding connecting portion 11, and a cable-side L-shaped portion 13b which is disposed on the side of the external cable connecting portion 12. The winding-side L-shaped portion 13a is a portion that is connected to the stator winding connecting portion 11 and extends in the rotation axis direction. The cable-side L-shaped portion 13b is a portion that is connected to the external cable connecting portion 12 and extends in the alignment orthogonal direction. The winding-side L-shaped portion 13a is connected to the cable-side L-shaped portion 13b.

As shown in FIG. 5, in each terminal pin 7, a proximal end 11c of the stator winding connecting portion 11, the winding-side L-shaped portion 13a of the L-shaped portion 13, and an end 13c on the side of the winding-side L-shaped portion 13a of the L-shaped portion 13 are housed in the terminal pin holding portion 8. The external cable connecting portions 12 of the plurality of terminal pins 7 are arranged in a staggered manner when viewed along the rotation axis direction. In other words, the plurality of terminal pins 7 respectively have the cable-side L-shaped portions 13b with different lengths so that the external cable connecting portions 12 are arranged in a staggered manner.
(Method for Manufacturing the Stator Assembly E)

Next, a method for manufacturing the stator assembly E will be described with reference to FIGS. 11 to 15. Note that FIGS. 11 to 15 illustrate the state of each external cable connecting portion 12 before crimping, and the illustration of the state of each external cable connecting portion 12 after crimping is omitted for convenience of illustration.

Figure 11:
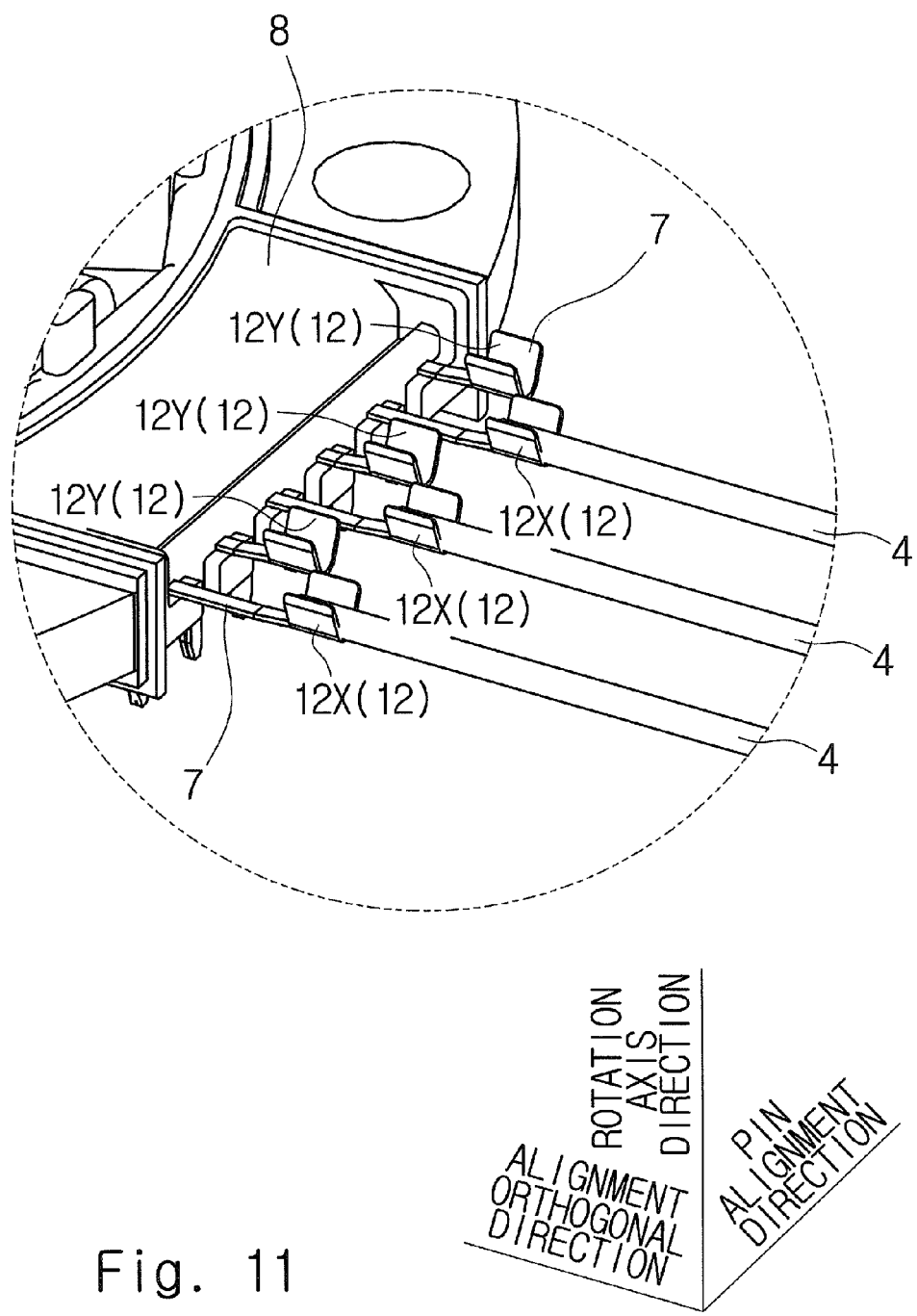
FIG. 11 is a partial perspective view of the stator of the resolver, and shows a state in which external cables are respectively attached to external cable connecting portions disposed on a front side (first embodiment)
Figure 12:
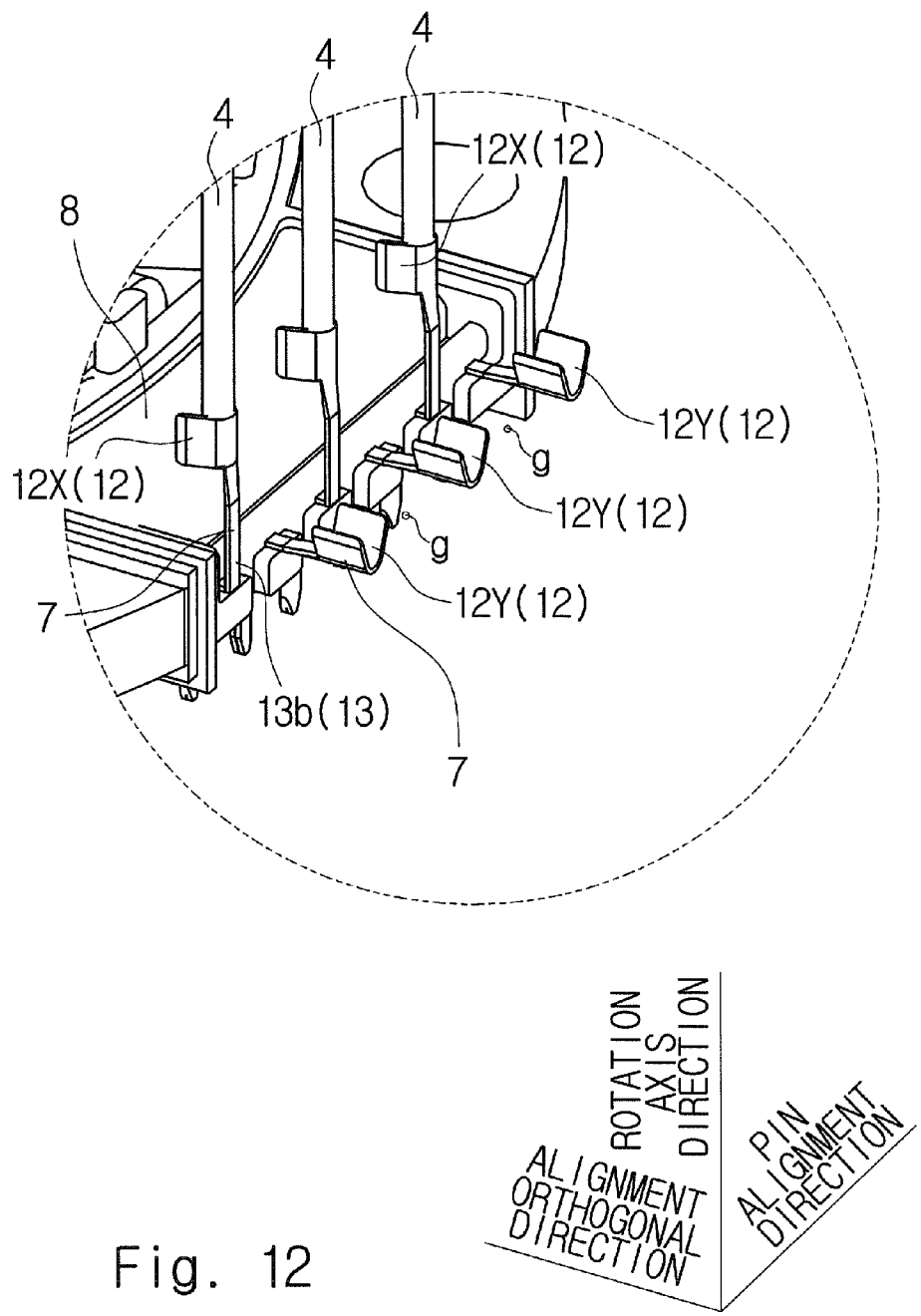
FIG. 12 is a partial perspective view of the stator of the resolver, and shows a state in which the external cable connecting portions disposed on the front side are raised upward (first embodiment)
Figure 13:
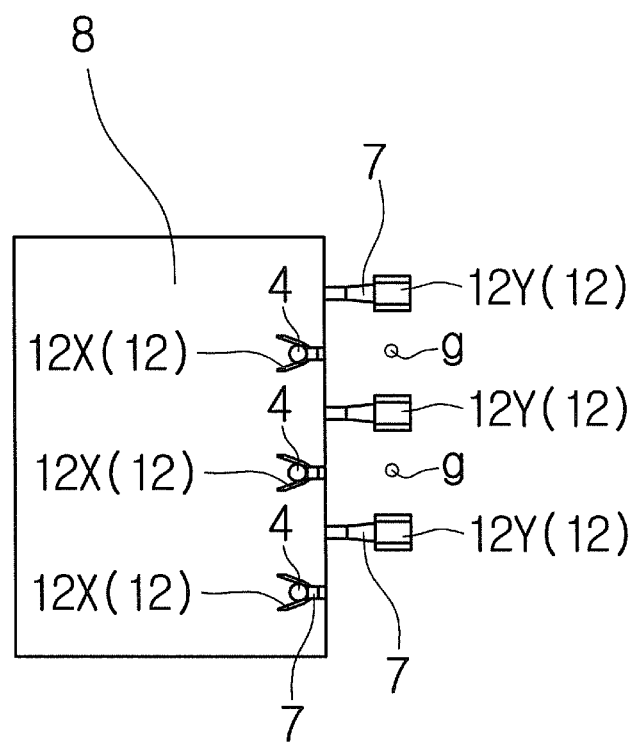
FIG. 13 is a partial plan view of the stator of the resolver, and shows gaps between external cable connecting portions disposed on a back side (first embodiment)
Figure 14:
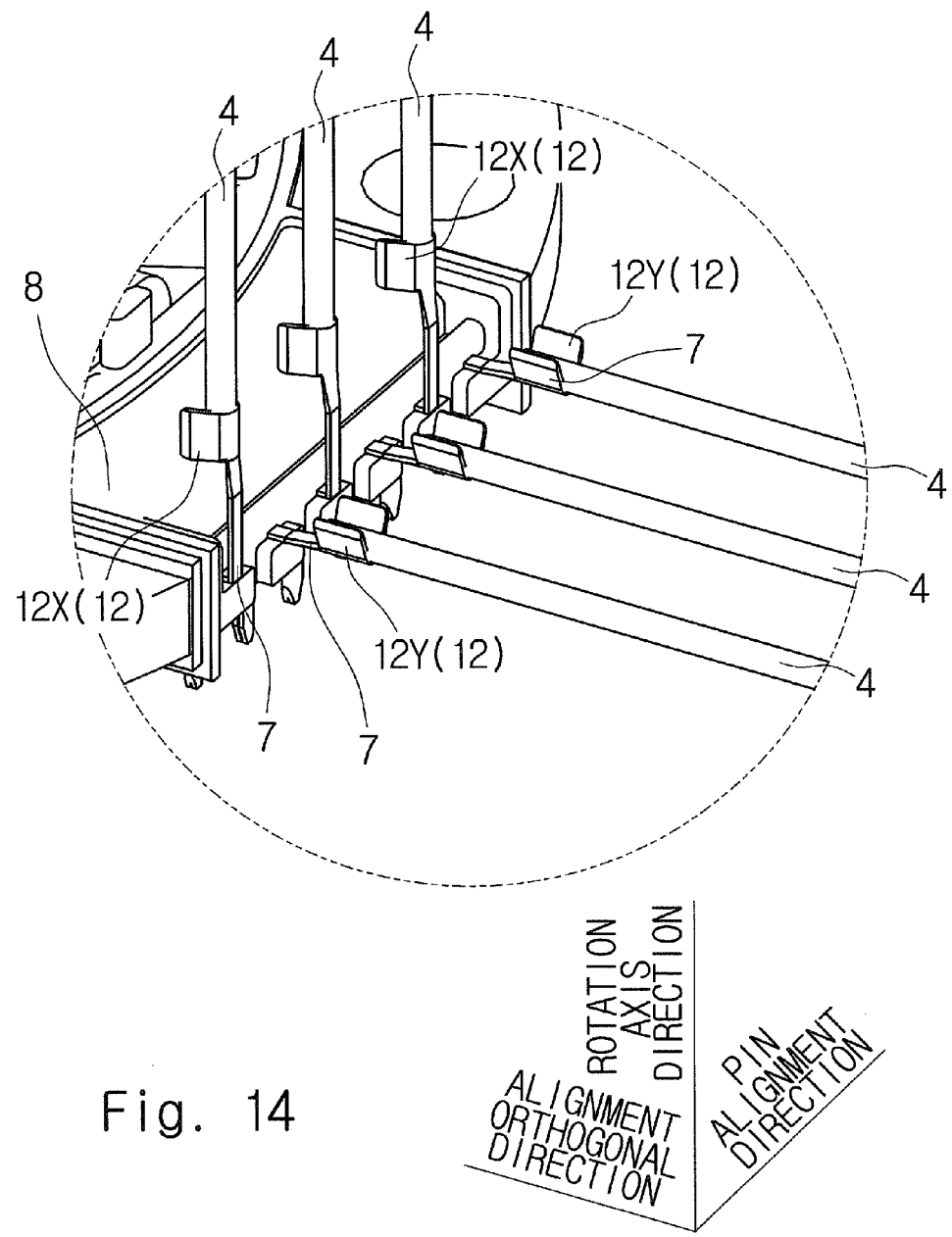
FIG. 14 is a partial perspective view of the stator of the resolver, and shows a state in which the external cables are respectively attached to the external cable connecting portions disposed on the back side (first embodiment)
Figure 15:
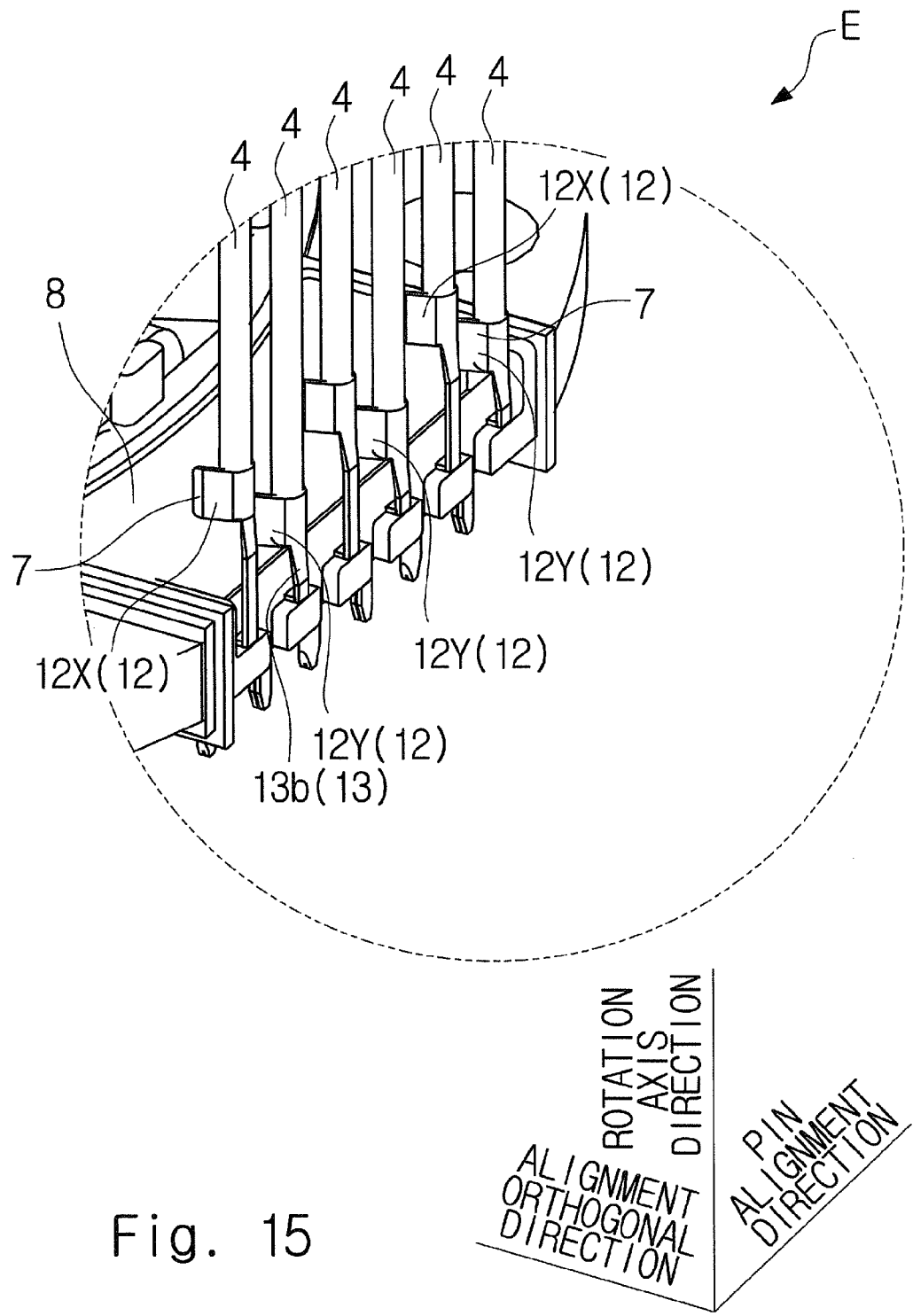
FIG. 15 is a partial perspective view of the stator of the resolver, and shows a state in which the external cable connecting portions disposed on the back side are raised upward (first embodiment)

Referring first to FIG. 11, three external cables 4 are simultaneously crimped and connected to three front-side external cable connecting portions 12X, respectively, which serve as the external cable connecting portions 12 disposed on the front side (on the side far from the terminal pin holding portion 8) among the plurality of external cable connecting portions 12 arranged in the staggered manner. Next, as shown in FIG. 12, the cable-side L-shaped portions 13b of the L-shaped portions 13 of the terminal pins 7 respectively including the front-side external cable connecting portions 12X are bent, thereby causing the front-side external cable connecting portions 12X to be displaced so as to be raised upward. As a result, as shown in FIGS. 12 and 13, gaps g are formed between three back-side external cable connecting portions 12Y which serve as the external cable connecting portions 12 disposed on the back side (on the side close to the terminal pin holding portion 8) among the plurality of external cable connecting portions 12 arranged in the staggered manner. Next, as shown in FIG. 14, three external cables 4 are simultaneously crimped and connected to the three back-side external cable connecting portions 12Y, respectively. Lastly, as shown in FIG. 15, the cable-side L-shaped portions 13b of the L-shaped portions 13 of the terminal pins 7 respectively including the back-side external cable connecting portions 12Y are bent, thereby causing the back-side external cable connecting portions 12Y to be displaced so as to be raised upward.

The first embodiment of the present invention described above has the following features.

Figure 18:
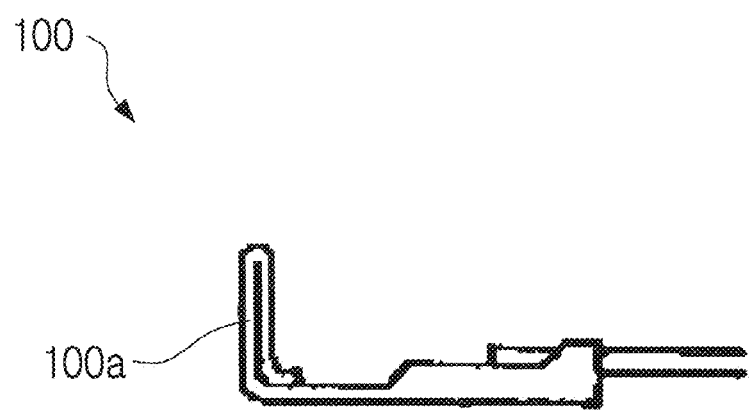
FIG. 18 is a diagram corresponding to FIG. 7 of Patent Literature 1.

(1) The stator 3 of the resolver 1 includes: the stator body 5 including the plurality of magnetic pole portions 10; the plurality of stator windings 6 respectively wound around the magnetic pole portions 10; the plurality of terminal pins 7 each having the stator winding connecting portion 11 around which the corresponding stator winding 6 is wound and the external cable connecting portion 12 to be connected with the corresponding external cable 4; and the terminal pin holding portion 8 that holds the plurality of terminal pins 7. The stator winding connecting portion 11 of each terminal pin 7 is formed in a double layer by folding the metal piece M and has the fold 11a which is formed when the metal piece M is folded. The fold 11a of the stator winding connecting portion 11 of each terminal pin 7 is formed along the longitudinal direction of the stator winding connecting portion 11. According to the structure described above, the length of the fold 11a can be increased, thereby achieving an improvement in the strength of the stator winding connecting portion 11. Accordingly, an advantageous effect that the stator winding connecting portions 11 are hardly deformed is obtained even if a force that causes the stator winding connecting portions 11 to be bent in a direction orthogonal to the rotation axis direction acts on the stator winding connecting portions 11 during winding of the stator windings 6 around the stator winding connecting portions 11, or during cutting of the stator windings 6 after the winding. If necessary, refer to the fold disclosed in Patent Literature 1 shown in FIG. 18.

Further, according to the structure described above, the number of the cutting edges 11d of the metal piece M extending along the longitudinal direction of each stator winding connecting portion 11 is reduced due to the presence of the fold 11a. This prevents the stator windings 6 from being unintentionally cut when the stator windings 6 are respectively wound around the stator winding connecting portions 11. In other words, there are at least four cutting edges 11d capable of cutting each stator winding 6 in Patent Literature 1 shown in FIG. 18, whereas in this embodiment, there are two cutting edges 11d capable of cutting each stator winding 6.

(2) The stator winding connecting portion 11 of each terminal pin 7 has a single fold 11a, and the stator winding connecting portion 11 of each terminal pin 7 has a U-shaped cross-section. Specifically, as compared with the case where the stator winding connecting portion 11 of each terminal pin 7 has two folds 11a, the cutting edges 11d of the metal piece M extending along the longitudinal direction of the stator winding connecting portion 11 remain in the structure described above, which makes it possible to cut each stator winding 6 by using the cutting edges 11d. Note that in a second embodiment to be described later, there are no cutting edges 11d capable of cutting each stator winding 6.

(3) The distal end 11b of the stator winding connecting portion 11 of each terminal pin 7 has a tapered shape. According to the structure described above, when the stator winding connecting portion 11 and the stator winding 6 are welded together, the area in which electricity is discharged to the distal end 11b of the stator winding connecting portion 11 is determined, so that the melted area of the distal end 11b of the stator winding connecting portion 11 can be stabilized.

(4) The distal end 11b of the stator winding connecting portion 11 of each terminal pin 7 is tapered in a V-shape. According to the structure described above, when the stator winding connecting portion 11 and the stator winding 6 are welded together, the melted area of the distal end 11b of the stator winding connecting portion 11 can be fixed at the center in the width direction (at the center in the alignment orthogonal direction), thereby achieving stable welding.

(5) The plurality of external cable connecting portions 12 are arranged in a staggered manner. According to the structure described above, the plurality of external cable connecting portions 12 can be arranged at a narrow pitch.

(6) Each external cable connecting portion 12 is an open barrel type. Alternatively, a closed barrel type may be used as each external cable connecting portion 12.

(7) The stator assembly E includes the plurality of external cables 4, and the stator 3 of the resolver 1, the stator 3 including: the stator body 5 including the plurality of magnetic pole portions 10; the plurality of stator windings 6 respectively wound around the magnetic pole portions 10; the plurality of terminal pins 7 each including the stator winding connecting portion 11 around which the corresponding stator winding 6 is wound and the external cable connecting portion 12 to be connected with the corresponding external cable 4; and the terminal pin holding portion 8 that holds the plurality of terminal pins 7, the plurality of external cable connecting portions 12 being arranged in a staggered manner. The stator assembly E is manufactured by the following method. The method includes the steps of: connecting the external cables 4 to the front-side external cable connecting portions 12X serving as the external cable connecting portions 12 disposed on the front side among the plurality of external cable connecting portions 12 arranged in the staggered manner; bending the terminal pins 7 respectively including the front-side external cable connecting portions 12X to cause the front-side external cable connecting portions 12X to be displaced; and connecting the external cables 4 to the back-side external cable connecting portions 12Y serving as the external cable connecting portions 12 disposed on the back side among the plurality of external cable connecting portions 12 arranged in the staggered manner. According to the method described above, when the external cables 4 are respectively connected to the back-side external cable connecting portions 12Y, the gaps g can be formed between the adjacent back-side external cable connecting portions 12Y. These gaps g have the following technical meaning.

Figure 16:
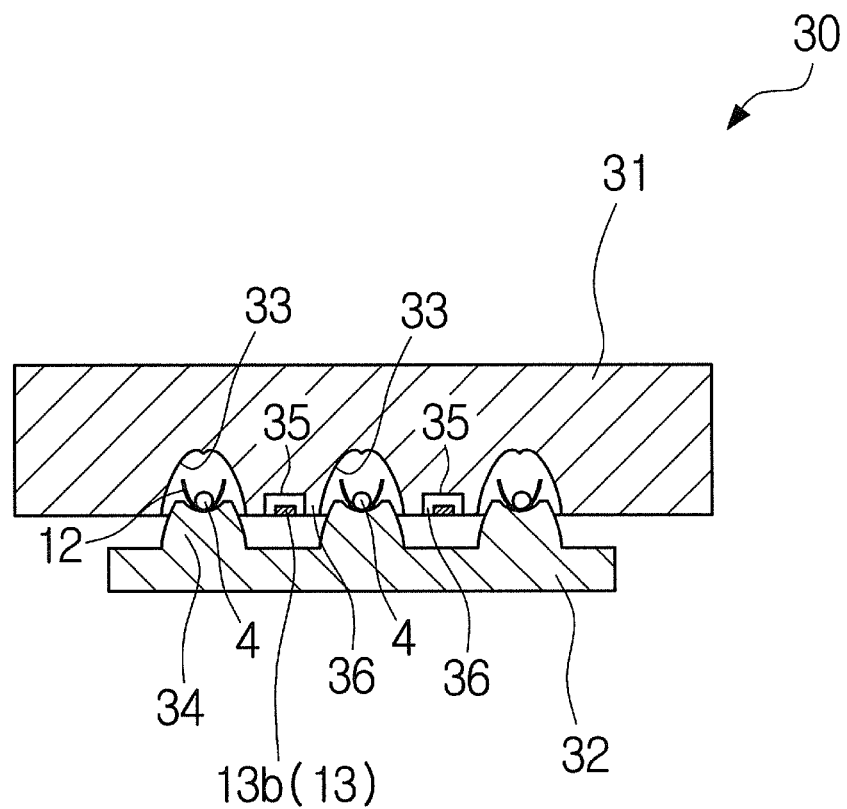
FIG. 16 is a sectional view showing a state in which the external cables are respectively attached to the external cable connecting portions disposed on the back side (first embodiment)

FIG. 16 shows a crimping jig 30 that allows three external cable connecting portions 12 to be crimped at the same time. The crimping jig 30 is composed of a female-side jig 31 and a male-side jig 32. The female-side jig 31 has three recesses 33 formed therein. The male-side jig 32 has three protrusions 34 formed thereon. Each external cable connecting portion 12 crimps the corresponding external cable 4 when the male-side jig 32 is moved toward the female-side jig 31 in the state where the external cable connecting portion 12 and the external cable 4 are set at a tip end of the corresponding protrusion 34. In this structure, if the cable-side L-shaped portions 13b instead of the gaps g shown in FIG. 13 are provided, it is necessary to form accommodating recesses 35, each of which accommodates a corresponding one of the cable-side L-shaped portions 13b, between the adjacent recesses 33 in the female-side jig 31 as shown in FIG. 16. When the accommodating recesses 35 are formed between the adjacent recesses 33, thin-walled portions 36 are generated between each recess 33 and each accommodating recess 35. The presence of the thin-walled portions 36 leads to a decrease in the lifetime of the female-side jig 31. On the other hand, according to the method described above, the gaps g are actively formed, to thereby eliminate the need for the accommodating recesses 35. This makes it possible to prevent the generation of the thin-walled portions 36 and to increase the lifetime of the female-side jig 31.

(8) The stator assembly E includes the plurality of external cables 4, and the stator 3 of the resolver 1, the stator 3 including: the stator body 5 including the plurality of magnetic pole portions 10; the plurality of stator windings 6 respectively wound around the magnetic pole portions 10; the plurality of terminal pins 7 each including the stator winding connecting portion 11 around which the corresponding stator winding 6 is wound and the external cable connecting portion 12 to be connected with the corresponding external cable 4; and the terminal pin holding portion 8 that holds the plurality of terminal pins 7, the plurality of external cable connecting portions 12 being arranged in a staggered manner. The stator assembly E is manufactured in the following manner. The external cables 4 are connected to the front-side external cable connecting portions 12X serving as the external cable connecting portions 12 disposed on the front side among the plurality of external cable connecting portions 12 arranged in the staggered manner. The terminal pins 7 respectively including the front-side external cable connecting portions 12X are bent to cause the front-side external cable connecting portions 12X to be displaced. The external cables 4 are connected to the back-side external cable connecting portions 12Y serving as the external cable connecting portions 12 disposed on the back side among the plurality of external cable connecting portions 12 arranged in the staggered manner. According to the structure described above, when the external cables 4 are respectively connected to the back-side external cable connecting portions 12Y, the gaps g can be formed between the adjacent back-side external cable connecting portions 12Y.

Second Embodiment

Figure 17:
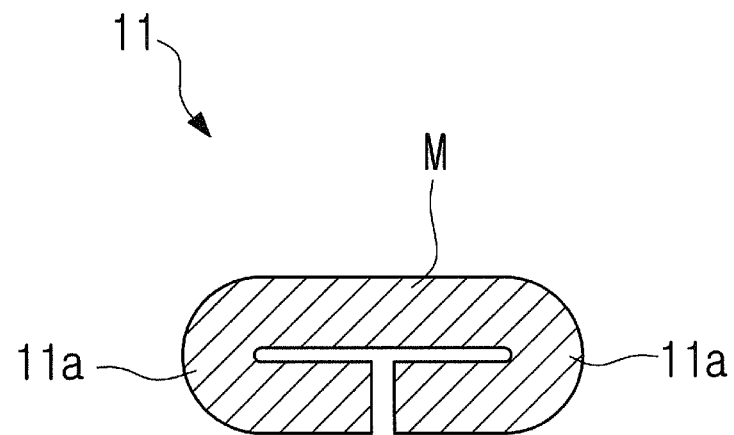
FIG. 17 is a diagram corresponding to the sectional view taken along the line X-X of FIG. 9 (second embodiment)

Next, a second embodiment of the present invention will be described with reference to FIG. 17.

In the first embodiment described above, the stator winding connecting portion 11 has a single fold 11a as shown in FIG. 10. Accordingly, the stator winding connecting portion 11 has a U-shaped cross-section. On the other hand, in this embodiment, the stator winding connecting portion 11 has two folds 11a as shown in FIG. 17. Accordingly, the stator winding connecting portion 11 has a C-shaped cross-section. Since the stator winding connecting portion 11 of this embodiment has a C-shaped cross-section, the stator winding connecting portion 11 has an improved strength against bending, as compared with the stator winding connecting portion 11 of the first embodiment.

This application is based upon and claims the benefit of priority from Japanese patent application No. 2012-080440, filed on Mar. 30, 2012, the disclosure of which is incorporated herein in its entirety by reference.

REFERENCE SIGNS LIST

1 Resolver
2 Rotor
3 Stator
4 External Cable
5 Stator Body
6 Stator Winding
7 Terminal Pin
8 Terminal Pin Holding Portion
9 Insulation Cover
10 Magnetic Pole Portion
11 Stator Winding Connecting Portion
11a Fold
11b Distal End
11c Proximal End
11d Cutting Edge
12 External Cable Connecting Portion
12X Front-Side External Cable Connecting Portion
12Y Back-Side External Cable Connecting Portion
13 L-Shaped Portion
13a Winding-Side L-Shape Portion
13b Cable-Side L-Shape Portion
13c End
30 Crimping Jig
31 Female-Side Jig
32 Male-Side Jig
33 Recess
34 Protrusion
35 Accommodating Recess
36 Thin-Walled Portion
E Stator Assembly
G Gap
M Metal Piece

The invention claimed is:

1. A stator of a resolver, comprising:
a stator body including a plurality of magnetic pole portions;
a plurality of stator windings respectively wound around the magnetic pole portions;
a plurality of terminal pins each including: a stator winding connecting portion around which the corresponding stator winding is wound; and an external cable connecting portion to be connected with an external cable; and
a terminal pin holding portion that holds the plurality of terminal pins, wherein
the stator winding connecting portion of each of the terminal pins is formed in a double layer by folding a metal piece, and has a fold formed when the metal piece is folded, and
the fold of the stator winding connecting portion of each of the terminal pins is formed along a longitudinal direction of the stator winding connecting portion.

2. The stator of a resolver according to claim 1, wherein the stator winding connecting portion of each of the terminal pins has a single fold, and the stator winding connecting portion of each of the terminal pins has a U-shaped cross-section.

3. The stator of a resolver according to claim 1, wherein a distal end of the stator winding connecting portion of each of the terminal pins has a tapered shape.

4. The stator of a resolver according to claim 3, wherein the distal end of the stator winding connecting portion of each of the terminal pins is tapered in a V-shape.

5. The stator of a resolver according to claim 1, wherein the plurality of external cable connecting portions are arranged in a staggered manner.

6. The stator of a resolver according to claim 5, wherein each of the external cable connecting portions is an open barrel type.

7. A method for assembling a stator assembly, the stator assembly comprising:
a plurality of external cables; and
a stator of a resolver, the stator including: a stator body including a plurality of magnetic pole portions; a plurality of stator windings respectively wound around the magnetic pole portions; a plurality of terminal pins each including a stator winding connecting portion around which the corresponding stator winding is wound and an external cable connecting portion to be connected with the corresponding external cable; and a terminal pin holding portion that holds the plurality of terminal pins, the plurality of external cable connecting portions being arranged in a staggered manner,
the method comprising the steps of:
connecting the external cables to front-side external cable connecting portions, respectively, the front-side external cable connecting portions serving as external cable connecting portions disposed on a front side among the plurality of external cable connecting portions arranged in the staggered manner;
bending the terminal pins respectively including the front-side external cable connecting portions to cause the front-side external cable connecting portions to be displaced; and
connecting the external cables to back-side external cable connecting portions, respectively, the back-side external cable connecting portions serving as external cable connecting portions disposed on a back side among the plurality of external cable connecting portions arranged in the staggered manner.

* * * * *